July 30, 1957  G. L. OMON ET AL  2,800,948
SHOCK ABSORBING TRACTOR SEAT
Filed Dec. 30, 1953  3 Sheets-Sheet 1
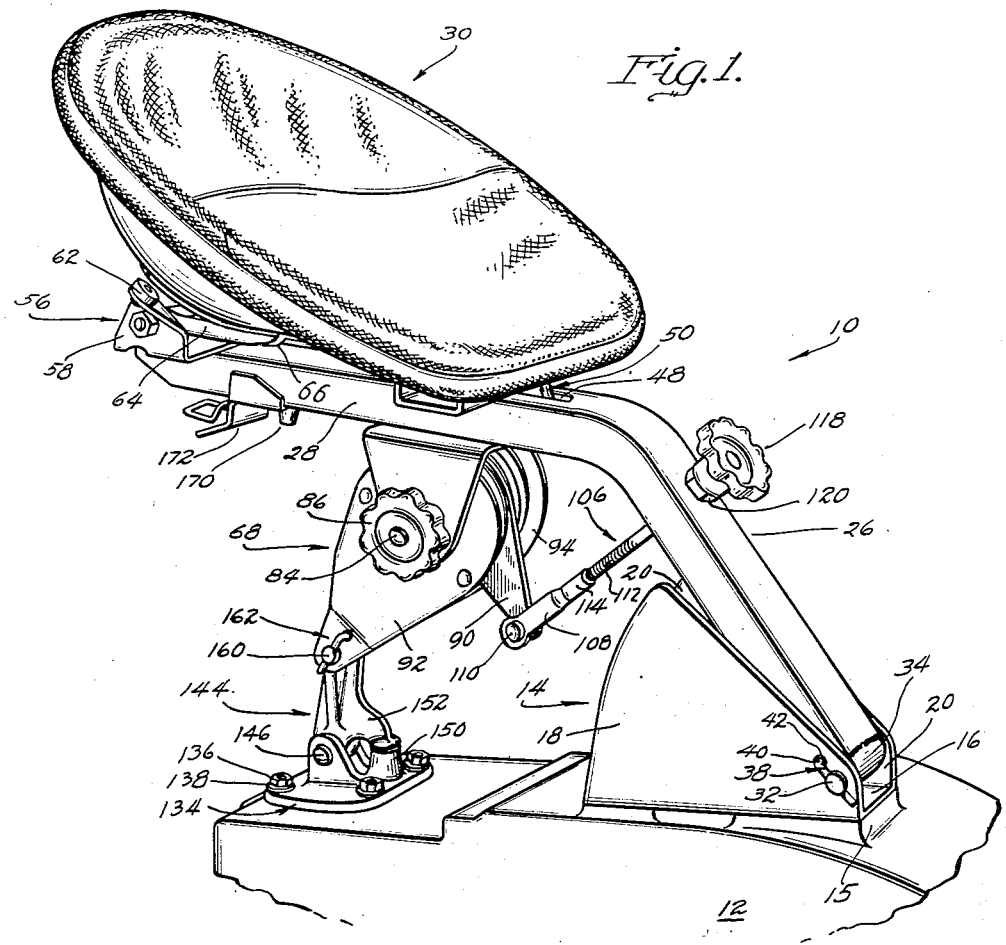
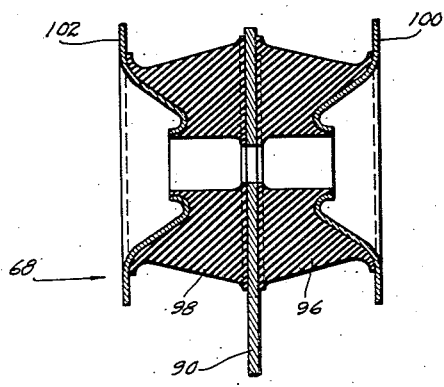
INVENTORS.
GENE L. OMON
BY EARL C. THAYER
Agent

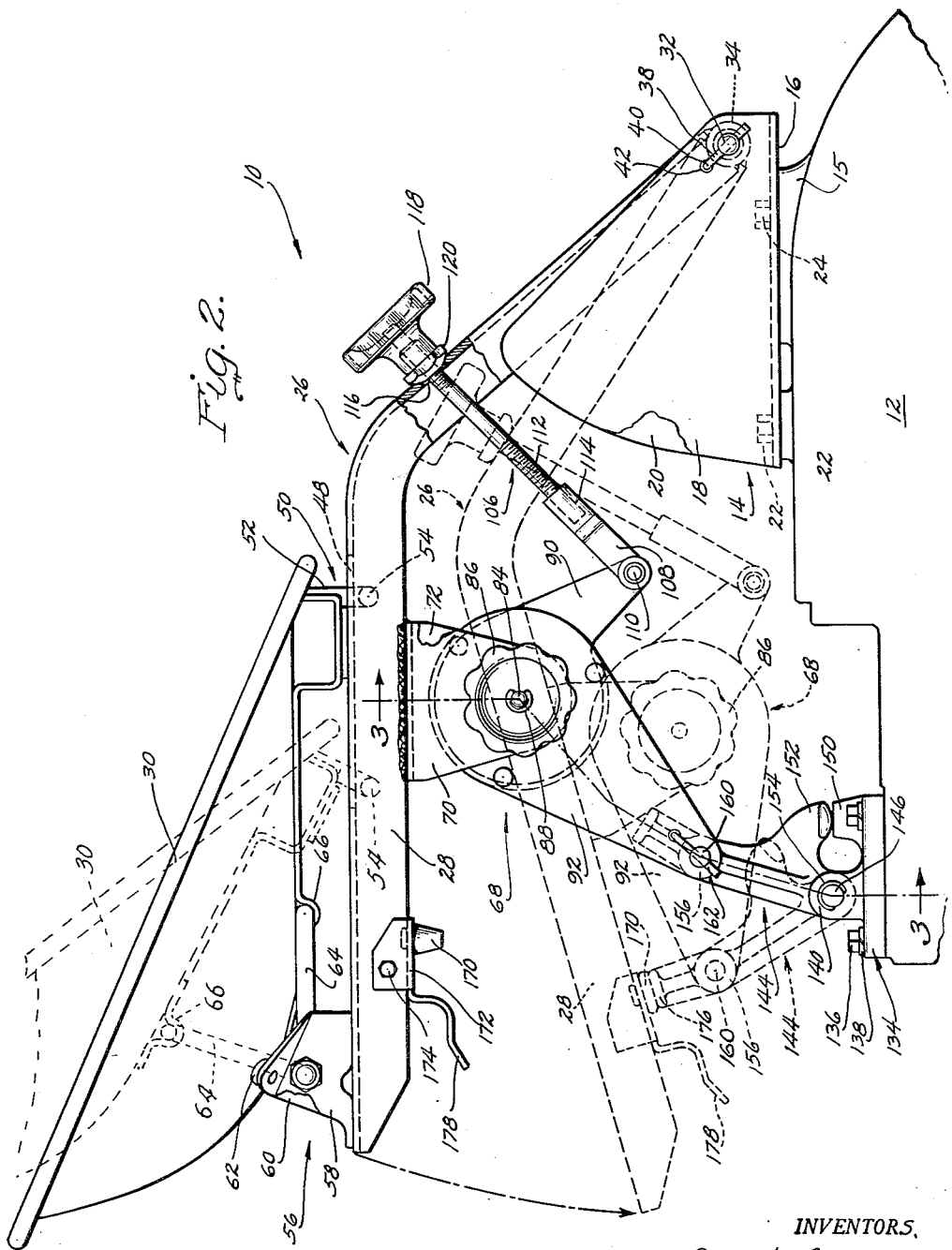

July 30, 1957  G. L. OMON ET AL  2,800,948
SHOCK ABSORBING TRACTOR SEAT
Filed Dec. 30, 1953  3 Sheets-Sheet 3

INVENTORS.
GENE L. OMON
BY EARL C. THAYER

United States Patent Office 2,800,948
Patented July 30, 1957

2,800,948

SHOCK ABSORBING TRACTOR SEAT

Gene L. Omon, Milwaukee, and Earl C. Thayer, Racine, Wis., assignors to J. I. Case Company, Racine, Wis., a corporation of Wisconsin Application December 30, 1953, Serial No. 401,120

11 Claims. (Cl. 155—57)

This invention relates to seats for tractor operators, and especially to the type of seats having rubber torsional members as the cushioning and the shock absorbing means.

An increasing amount of time of farmers is being spent in tractor seats, and it is becoming increasingly important to reduce fatigue of the operator who must remain in the seat for a considerable length of time.

Generally fatigue, to which tractor operators are subjected, is that caused by vibration of the tractor and sudden lurching and swaying when passing over uneven ground. It is the purpose of this invention to prevent as much as possible the fatigue of tractor operators.

Fatigue can be partially eliminated by proper seat cushions such as those having hair or other well known padding. Air filled cushions are also effective as a means of preventing fatigue. These aids are partially effective, but do not completely solve the problem. Cushions can only absorb the smaller vibrations and movements of the tractor.

The present trend in cushioning tractor seats is to employ shock absorbers, and it is one object of this invention to provide a shock absorber means having a minimum number of working parts.

This invention makes use of a resilient rubber torsional unit in which the resilient portion is made to absorb shocks by twisting in a manner analogous to shock absorption by a spiral spring.

Referring to the drawings:

Fig. 1 is a side perspective elevational view of a tractor seat embracing the present invention.

Fig. 2 is a side elevational view of the seat with parts broken away, and with the seat under load being shown in dotted lines.

Fig. 4 is an axial sectional view of the rubber-and-metal torsional member which is employed with this invention.

Figure 3:
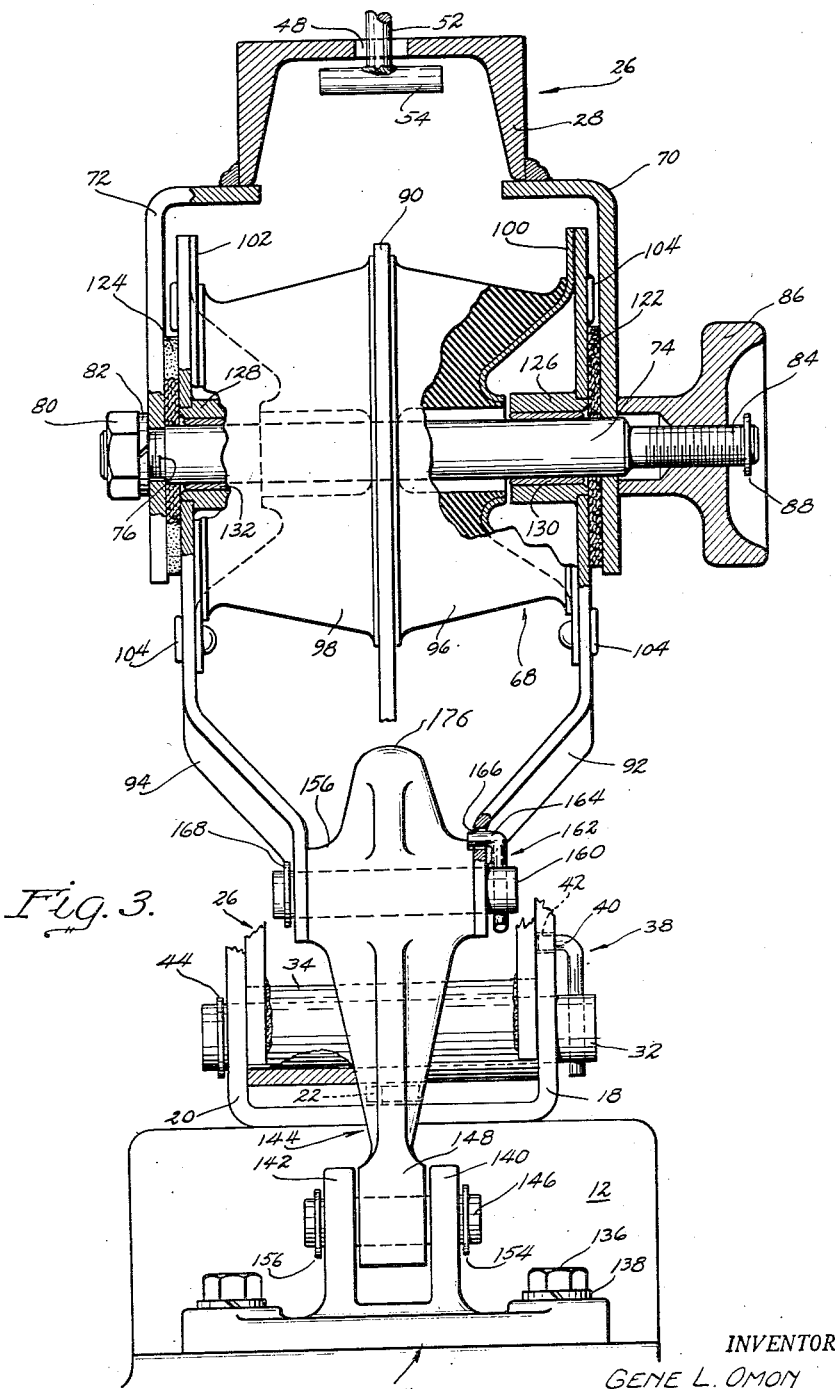
Fig. 3 is an enlarged fragmentary sectional view through line 3—3 of Fig. 2.

Referring to Fig. 1, the seat assembly 10 is mounted upon a tractor frame 12, which is provided with a suitable pad for the reception of a seat bracket. Bracket 14 is secured to pad 15 and comprises a base portion 16 and spaced vertical side walls 18 and 20. Bracket 14 is secured to pad 15 by a plurality of cap screws such as 22 and 24. A seat supporting arm 26 extends upwardly and rearwardly from the forward portion of bracket 14. Arm 26 is of channel-shape cross section, shown in Fig. 3, and is formed as shown in Fig. 2, having a horizontal portion 28 to accommodate seat 30.

Seat supporting arm 26 is pivoted at the forward portion of bracket 14 on a pin 32 which is passed transversely through wall portions 18 and 20, as shown in Figs. 1 and 2, suitable holes being provided for the purpose. Arm 26 terminates in a sleeve 34 which is freely rotatable on pin 32 and extends freely between walls 18 and 20. Arm 26 is welded or otherwise secured integrally with sleeve 34. Pin 32 is secured against axial displacement and rotation by a pin 38 which passes through pin 32 diametrically, and which has a bent portion 40 which is keyed in a hole 42 in wall 18. A snap ring 44 of the type which engages a groove about the periphery of the pin is provided at the other end of pin 32 in order to prevent axial displacement when the pin 32 has been assembled. When assembling, pin 32 is inserted through the hole in wall 18, sleeve 34, and wall 20, until portion 40 of pin 38 enters hole 42, the above mentioned snap ring being then assembled on the other end of pin 32. Pin 32 is thus prevented from rotating or becoming axially displaced, and provides a journal seat for support arm 26.

Seat 30 rests upon horizontal portion 28 of arm 26, as shown in Figs. 1 and 2, and is of the conventional type which has been found most satisfactory. Seat 30 is arranged to be pushed back to permit the operator to conveniently step down from the tractor and which arrangement is clearly shown in Fig. 2. The forward portion of seat 30 is anchored to arm 26 and slides in a slot 48 in the horizontal surface of portion 28. The anchoring means 50 comprises a post 52 which is welded or otherwise secured to seat 30 and extends downwardly through slot 48 and terminates in a horizontal portion 54. This arrangement provides an anchor to permit seat 30 to slide easily and also prevents it from lifting from the horizontal portion 28.

A bracket 56 is provided and is bolted or otherwise secured to the horizontal portion 28 at a point rearwardly of anchoring means 50. Bracket 56 is shaped as shown in Figs. 1 and 2, having vertical walls 58 and 60 which terminate in outwardly and upwardly bent portions which conform generally to the seat 30. A fabric-and-rubber cushion washer 62, is riveted to the bent portion of each of walls 58 and 60 to partially prevent the seat 30 from excessive lateral and fore-and-aft shifting.

A crank-shaped seat support 64 is pivoted in walls 58 and 60 on a transverse axis and is pivotally secured to seat 30 by a strap 66. When an operator desires to stand up he moves backwardly against the seat 30. Horizontal portion 54 slides rearwardly in slot 48 and seat support 64 rotates counterclockwise, thus raising seat 30 to the position shown in dotted lines in Fig. 2.

A rubber and metal torsional member 68 is employed as the shock absorbing means in this invention and is mounted at a convenient point as shown in Fig. 2. Member 68 is mounted below seat supporting arm 26 in a pair of bracket plates 70 and 72, the latter brackets being welded or otherwise secured integrally with channel portion 28, as clearly shown in Fig. 3.

A pivot bolt 74, the body portion of which passes through a hole in bracket 70 and has a reduced portion 76 extending through a hole in bracket 72 is shown in Fig. 3. Reducing the diameter of bolt 74 as at 76 provides a shoulder which abuts the inner surface of bracket 72. A nut 80 and a lock washer 82 provide means to secure bolt 74 against rotation in bracket 72. The end 84 of bolt 74 extends beyond bracket 70 and is threaded to accommodate a hand wheel 86. A snap ring 88 fits in a groove to prevent inadvertent removal of hand wheel 86 from end 84.

Torsional member 68 comprises a central torsion arm 90 as shown in Figs. 1, 2, and 3 which is provided with a central hole co-operating with bolt 74 in order to confine arm 90 centrally about the bolt, but to permit rotation of the arm relative to the bolt. A pair of secondary torsion arms 92 and 94 are spaced outwardly from arm 90 as shown in Fig. 2, and of a contour as shown. Resilient torsional elements of a truncated form 96 and 98, are employed which have their bases bonded to the faces of arm 90 and having their smaller diameters extending toward secondary arms 92 and 94. Caps 100 and 102 are bonded to the outer ends of resilient portions 96 and 98 as shown in Figs. 3 and 4. These caps have a conical portion extending inwardly to provide torsional characteristics found necessary in a device of this nature, and have outwardly directed flange portions co-extensive with the contour of arms 92 and 94. A plurality of rivets 104 pass through arms 92 and 94, and caps 100 and 102 respectively, providing a unitary assembly of resilient torsional members and arms 92 and 94. It will be clear that there is a resilient torsional relationship between arm 90 and arms 92 and 94 so that angular displacement of arm 90 is resisted by the torsion of conical portions 96 and 98. It is necessary to anchor arm 90 against clockwise rotation about the axis of bolt 74, and this arrangement will be now described.

Referring to Figs. 1 and 2, an adjusting means 106 is provided which can be conveniently reached by the operator, so he can adjust the seat for the most comfortable riding condition. Adjusting means 106 comprises a bifurcated yoke 108, which is pivoted to the end of arm 90 by a pin 110 which passes through a hole in arm 90 and holes in the bifurcations of yoke 108. Pin 110 has a head at one end and a cotter pin is inserted in a suitable hole in the other end. This pin is conventional and need not be further described.

A threaded adjusting member 112 engages a thread in the shank 114 of yoke 108. Member 112 extends through a hole 116 in seat supporting arm 26 a suitable distance, the reason for which will be now described.

A hand knob 118 is threadedly engaged on the upper end of member 112 and a lock nut 120 is also threadedly engaged on member 112 and is of a hexagonal shape to enable a wrench to be applied to it. Nut 120 is preferably of brass, so as to serve as a thrust member to make adjustments easily under load. The surface of nut 120, which is in engagement with supporting arm 26, is of spherical contour and arm 26 surrounding hole 116 is countersunk. This construction provides freedom for member 112 to assume various angular positions with respect to hole 116 and permits also adjusting the resistance of the seat to suit the weight of different operators. When knob 118 has been positioned on member 112, nut 120 is threaded tightly against the knob thus locking the latter on member 112. There is a sufficiently long threaded portion engaging shank 114 to permit a wide range of adjustment. If an operator wishes to adjust the resiliency of the seat, he merely turns knob 86 in the proper direction until the desired ease is obtained.

It has been found necessary to employ a pair of snubber washers 122 and 124 in order to prevent undesirable oscillations of the seat. These washers are of brake lining or of similar material and are placed intermediate brackets 70 and 72 and arms 92 and 94 respectively, as shown in Fig. 3. When it is desired to control the operations of the seat when an operator is seated therein, the knob 86 is turned inwardly toward bracket 70 to increase the resistance to oscillation, and outwardly to permit more freedom.

The above mentioned adjustment is affected to a considerable extent by the outward, axial expansion of the rubber members comprising the torsional member 68 as shown in Fig. 3. This expansion takes place automatically when arms 92 and 94 are rotated clockwise relative to bolt 74, as clearly shown by dotted lines in Fig. 2. The result of the outward expansion of member 68 is to increase the friction between the surfaces of snubber members 122 and 124, and the adjacent metal surfaces of bracket 70 and arm 92, and bracket 72 and arm 94, respectively. Therefore when adjusting knob 86, it is necessary to take into account the above mentioned increase in friction induced by the above expansion which may be sufficient so that no adjustment of knob 86 is required.

Sleeves 126 and 128 are fitted in corresponding holes in arms 92 and 94 respectively by brazing the ends in this instance. Bosses 126 and 128 are provided with bronze bushings 130 and 132 in order to provide suitable bearings for arms 92 and 94 when the latter rotate about bolt 74 when seat 30 is raised or lowered.

Rearwardly of bracket 14 is secured an anchor bracket 134 which is secured to the tractor frame 12 by cap screws 136 and lock washers 138. Bracket 134 has provided thereon a plurality of lugs 140 and 142, clearly shown in Figs. 2 and 3. Pivoted in bracket 134 intermediate lugs 140 and 142 is a link 144 pivoted on a pin 146 which passes through lugs 140, 142, and a boss 148 of link 144. Bracket 134 has an abutment portion 150 located forwardly of lugs 140 and 142. Link 144 has a forwardly positioned portion 152 which coacts with abutment 150 to limit the forward movement of link 144. The purpose of abutment 150 and portion 152 will be made clear as the description progresses. Pin 146 is prevented from being displaced axially by snap rings 154 and 156 which are of the conventional type and fit peripheral grooves in the pin 146. Link 144 extends upwardly and forwardly and terminates in a boss portion 156 which is positioned intermediate the arms 92 and 94, as shown in Fig. 3. A pin 160 passes through the ends of arms 92, 94, and boss 156 in order to provide a suitable pivot. Pin 160 is secured against rotation relative to arms 92 and 94 and is also secured against axial displacement. To prevent rotation relative to arms 92 and 94, a pin 162 is passed diametrically through pin 160, as shown in Fig. 3, and this pin has a portion 164 bent at right angles thereto. Portion 164 cooperates with a hole 166 in arm 92 so that when pin 160 is inserted in the assembly of arms 92, 94, and boss 156, portion 164 prevents pin 160 from rotating. The end of pin 160, which protrudes from arm 94, is provided with a standard snap ring 168 which fits in a peripheral groove about pin 160. Thus it is clear that pin 160 is secured against rotating and also prevented from axial movement. When seat 30 is unloaded, resilient torsional member 68 will assume the position shown in Figs. 1 and 2, and this position pin 160 has assumed a position forwardly of a vertical line through pin 146 and in which instance abutment 150 and portion 152 are in contact. In this position, there is a positive contact between abutments 150 and 152 which limits the forward clockwise movement of pin 160.

When an operator is seated in seat 30, arm 26 is moved downwardly about pin 32 and if the seat is adjusted for a relatively light weight operator, assumes the position approximately shown by dotted lines. In this loaded position, link 144 assumes the position shown in dotted lines, having moved pin 160 counterclockwise and with arm 92 having also assumed a new position, as shown in dotted lines. This position of the seat however is under load in excess of that providing a comfortable riding condition and therefore hand wheel 118 should be turned to adjust arm 90 close to arm 26 or in a counterclockwise direction. When this has been done, the load required to bring the seat to the dotted position shown, would be greater and therefore the seat would assume a higher position, somewhere between the dotted and full-line positions, which would be a normal position.

The position shown by dotted lines in Fig. 2, being the extreme lower position, is limited by a resilient stop 170 which is secured to the underside of arm portion 28 by means of a bracket 172 secured to portion 28 by a bolt 174. Resilient stop 170 is so positioned as to contact a pad 176, which extends upwardly from the boss 156 of link 144. Resilient stop 170 is so placed, that when link 144 has reached its maximum counterclockwise position, that the resilient stop will contact pad 176.

It is clear that for the most comfortable riding conditions, resilient stop 170 should never contact pad 176, such contact being merely a safety means to prevent injury to the operator. For best conditions, knob 118 should be so adjusted as to permit stop 170 to float above pad 176 at all times. A crank clip 178 is provided as part of bracket 172 and holds the engine crank in a convenient location for use. However this is not part of the invention.

Various modes of carrying out the invention may be employed within the scope of the accompanying claims which particularly point out and distinctly set forth the subject matter regarded as the invention.

What we claim is:

1. In a vehicle seat having a torsional shock absorbing member, a forwardly extending medial arm and a pair of rearwardly extending torsional arms spaced at each side of the vertical plane of said medial arm and having resilient elements secured intermediate said medial arm and said torsional arms, in combination, a forward bracket, a cantilever seat support arm pivoted in said bracket and having a pair of downwardly depending bracket plates integral with said seat support arm, each of said bracket plates overhanging the outer surface of one of said torsional arms, a pivot member extending through said bracket plates and said shock absorbing member, snubber members surrounding said pivot member and disposed intermediate said torsional arms and said bracket plates, means co-operating with said pivot member to regulate the extent of friction between said snubber members, said bracket plates and said torsional arms, torsional adjusting means pivoted to said medial arm comprising a bifurcated yoke having a threaded portion, an adjusting stud threadedly engaged with said threaded portion and extending through said seat support arm, a manual means on said stud coacting with said seat support to adjust the angular position of said medial arm, a rearward bracket, and a link pivoted on said rearward bracket and extending upwardly intermediate said torsional arms and pivoted thereto, said link and said rearward bracket having co-operative stop means to limit the upper position of said seat, said link and said seat support arm having co-operative bumper means which engage upon said seat's reaching its lowest position.

2. In a vehicle seat, having a torsional shock absorbing member provided with a forwardly extending medial arm and a pair of rearwardly extending torsional arms spaced at each side of the plane of said medial arm, in combination, a forward bracket, a cantilever seat support arm pivoted in said bracket and having downwardly depending bracket plates integral with said seat support arm, each bracket plate overhanging the outer surface of one of said torsional arms, a pivot means extending through said bracket plates and said shock absorbing member, frictional members intermediate the adjacent surfaces of said torsional arms and said bracket plates and means co-operating with said pivot means to compress said frictional members into contact with said torsional arms and said bracket plates, adjusting means anchored to said medial arm comprising a yoke, an adjusting stud threadedly engaged with said yoke and extending through said seat support arm, a manual means engaging said stud to adjust the angular position of said medial arm, a rearward bracket, and a link intermediate said rearward bracket and said torsional arms and pivoted thereto, said link and said rearward bracket having co-operative means to limit the upper position of said seat.

3. In a vehicle seat, having a shock absorbing member comprising a forwardly extending medial arm and a pair of rearwardly extending spaced torsional arms, in combination, a forward bracket, a seat support arm pivoted in said bracket and having depending bracket plates adjacent the outer surface of said torsional arms, pivot means extending through said bracket plates and said shock absorbing member, snubber members intermediate said torsional arms and said bracket plates and means to adjust the friction between said snubber members said bracket plates and said torsional arms, adjusting means pivoted to said medial arm comprising a yoke, an adjusting stud threadedly engaged with said yoke, a manual means to adjust the angular position of said medial arm relative to said rearwardly extending torsional arms, a rearward bracket, a link extending upwardly and pivoted to said torsional arms and rearward bracket and co-operative means on said link and said rearward bracket to limit the upper position of said seat.

4. In a vehicle seat, having a torsional shock absorbing member comprising a forwardly extending medial arm and a pair of rearwardly extending torsional arms, in combination, a forward bracket, a seat support arm pivoted in said bracket and having bracket plates overhanging said shock absorber member, a pivot means for said shock absorbing member, snubber members intermediate said shock absorbing member and said bracket plates, and means co-operating with the pivot means to compress said snubber members intermediate said bracket plates and said torsional arms to adjust the resistance to relative rotation between said bracket plates and said shock absorbing member, and means to adjust the relative angular positions of said medial arm and said torsional arms, a rearward bracket, and a link pivoted intermediate said rearward bracket and said torsional arms.

5. In a vehicle seat, having a shock absorbing member comprising a forwardly extending medial arm and a rearwardly extending torsional arm, in combination, a forward bracket, a cantilever seat arm pivoted in said bracket and having supporting means for said shock absorbing member, means providing resistance to relative rotation between said supporting means and said shock absorbing member, adjusting means intermediate said medial arm and said seat arm to adjust the angular position of said medial arm, a rearward bracket, and a link pivoted intermediate said rearward bracket and said torsional arm.

6. In a vehicle seat, having a shock absorbing member comprising a forwardly extending arm and a rearwardly extending torsional arm, in combination, a forward bracket, a cantilever seat support arm on said bracket supporting said shock absorbing member, adjusting means to adjust the rotational angle between said forwardly extending arm and said rearwardly extending torsional arm, a rearward bracket, and a link pivoted between said rearward bracket and said torsional arm.

7. In a vehicle seat, having a shock absorbing member comprising a forwardly extending arm and a rearwardly extending torsional arm, in combination, a forward bracket, a cantilever seat support arm pivoted in said bracket and providing a depending support mounting said shock absorbing member, anchor means intermediate said forwardly extending arm and said seat support arm, a rearward bracket, a link pivoted to said rearward bracket and said torsional arm for fore-and-aft rotation in said rearward bracket, said link being provided at the upper end thereof with an abutment surface, and a resilient bumper depending from said seat support arm and positioned so as to contact said abutment surface upon said seat's assuming its maximum low position, said link and said rearward bracket having mutually contacting stops which engage upon said seat's assuming its maximum upper position.

8. In a vehicle seat, having a shock absorber comprising a pair of angularly spaced arms, in combination, a first bracket, a seat support pivoted in said first bracket and providing a mounting supporting said shock absorber, a second bracket, a link pivoted intermediate said second bracket and one of said arms and having stop means engaging said second bracket, anchor means intermediate the other arm and said seat support, and means to adjust the angle between said arms.

9. A support for a seat on a vehicle having a frame, said support being pivoted on said frame and having a shock absorber comprising first and second resiliently-related arms rotatable about a common axis, said first arm being pivotally anchored to said support, and a link having two ends pivoted at one end to said frame and at the other end to said second arm and provided with stop means engaging said frame.

10. In a vehicle seat having a shock absorber comprising a pair of pivotally connected angularly spaced arms and means connected to the arms arranged to yieldably resist angular changes therebetween, in combination, a first bracket fixed in relation to the vehicle, a generally rearwardly inclined seat support pivotally connected to said first bracket, means on said seat support connected with and carrying said shock absorber beneath said seat support, a second bracket spaced rearwardly from the first in the direction of said rearwardly inclined seat support and fixed in relation to said vehicle, one of said arms extending generally rearwardly over the last-mentioned bracket, a link connected between said second bracket and the last-mentioned arm, stop means interposed between said link and said bracket arranged to limit swinging of said link in one direction, the other arm of said shock absorber extending generally parallel to said seat support, anchor means connected between said seat support and the other arm and means for adjusting the position in which said other arm is held by said anchor means.

11. In a vehicle seat having a shock absorber comprising a pair of pivotally connected angularly spaced arms and means connected to the arms arranged to yieldably resist angular changes therebetween, in combination, a first bracket fixed in relation to the vehicle, a generally rearwardly inclined seat support pivotally connected to said first bracket, means on said seat support connected with and carrying said shock absorber beneath said seat support, a second bracket spaced rearwardly from the first in the direction of said rearwardly inclined seat support and fixed in relation to said vehicle, one of said arms extending generally rearwardly over the last-mentioned bracket, a link connected to said second bracket and to the last-mentioned arm, the other arm of said shock absorber extending generally parallel to said seat support, anchor means connected to said seat support and to the other arm and means for adjusting the position in which said other arm is held by said anchor means.

References Cited in the file of this patent
UNITED STATES PATENTS

| | | |
|---|---|---|
| 1,395,974 | Redfield | Nov. 1, 1921 |
| 2,452,280 | Zahller | Oct. 26, 1948 |
| 2,652,880 | Gunderson | Sept. 22, 1953 |